Nov. 24, 1942.                    D. M. SMITH                    2,303,237
                                 PISTON PACKING
                              Filed April 17, 1941
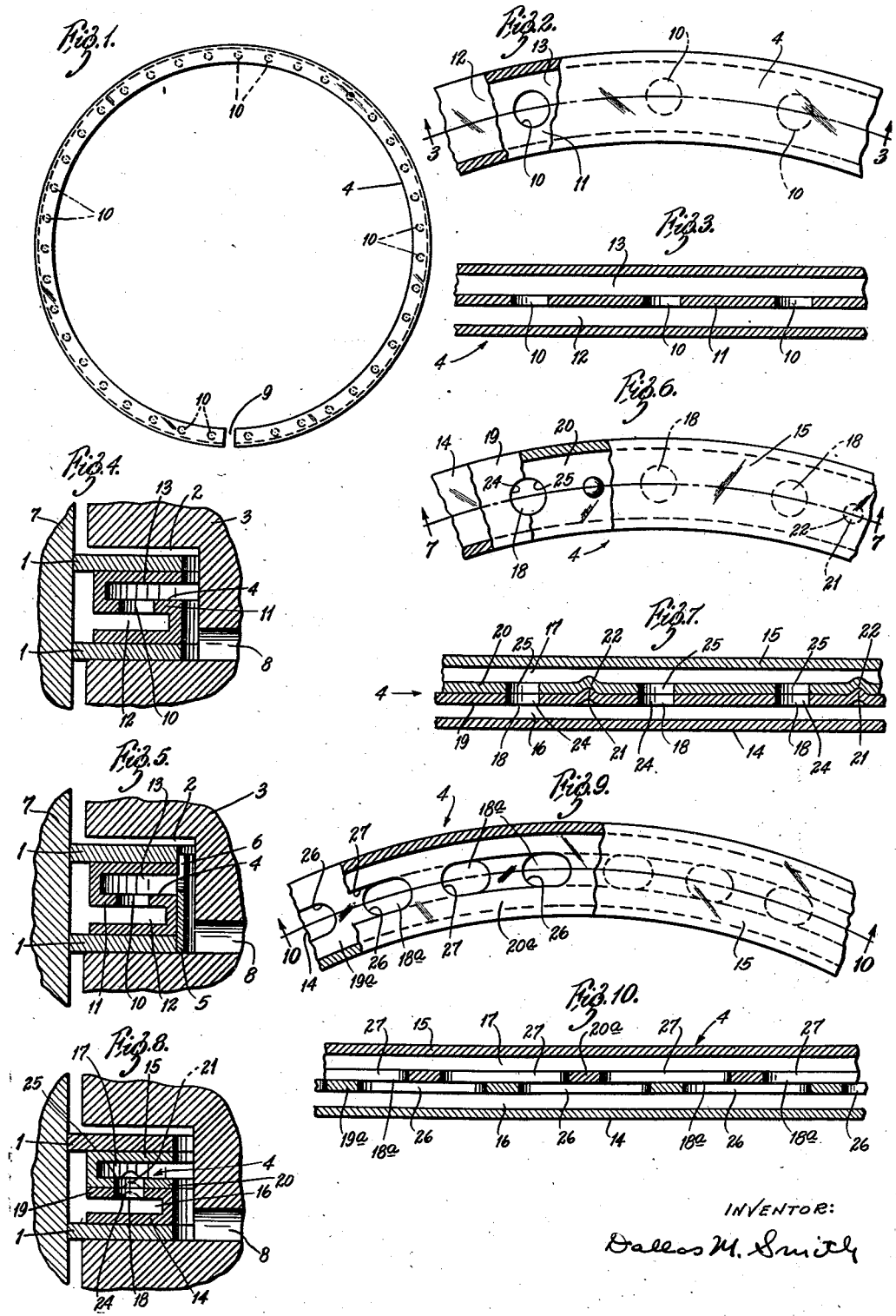
INVENTOR:
Dallas M. Smith Patented Nov. 24, 1942

2,303,237

UNITED STATES PATENT OFFICE 2,303,237

PISTON PACKING

Dallas M. Smith, Kirkwood, Mo., assignor to McQuay-Norris Manufacturing Company, St. Louis, Mo., a corporation of Delaware Application April 17, 1941, Serial No. 388,922

4 Claims. (Cl. 309—45)

My invention relates to multiple piece piston packings and more particularly to piston packings adapted for use as oil control rings.

A piston packing constructed according to my invention may include one or more split thin ring members in engagement with the cylinder wall and formed of ribbon material. The members are maintained in predetermined axial position in the ring groove of a piston by a spacer, preferably formed also of ribbon material bent to substantially circular form and having a substantially S-shaped cross-section. The spacer may be formed in one piece or may comprise two U-shaped sections positioned side by side. By forming a spacer in the manner described briefly above a pair of reservoirs are provided into which oil scraped from the cylinder wall by the ring members may flow. The reservoirs are positioned one below the other and are connected by a passage positioned in the upper part of the lower reservoir and opening into the upper reservoir. As oil accumulates in the lower reservoir it overflows into the upper reservoir and then passes to the bottom of the ring groove and thence through ports provided in the piston to the hollow interior thereof.

A piston packing constructed according to my invention removes excess oil from the cylinder wall and this excess oil is stored temporarily in the reservoir in the spacer provided for that purpose. The manner in which the spacer is formed permits the piston and cylinder wall to be lubricated adequately to prevent excessive wear of these parts.

Having thus briefly described my invention, one object thereof is to provide a piston packing which may be used as an oil control ring.

Another object of my invention is to provide a piston packing which is efficient in operation and cheap to manufacture.

A more specific object of my invention is to provide a multiple piece piston packing which removes excess oil from the cylinder wall, and adequately lubricates the piston and cylinder to prevent excessive wear of these parts.

Other objects and advantages will be apparent to those skilled in the art from the following description, wherein reference is made to the drawing which illustrates several preferred embodiments of my invention, and wherein like reference numerals designate like parts throughout the several views.

In the drawing, Fig. 1 is a plan view of a spacer constructed according to my invention; Fig. 2 is a detailed partial plan view thereof; Fig. 3 is a vertical section taken on the line 3—3 of Fig. 2; Figs. 4 and 5 show several arrangements in which piston packings constructed according to my invention may be assembled in the ring groove of a piston; Fig. 6 is a detailed partial plan view of a spacer showing a second embodiment of my invention; Fig. 7 is a vertical section taken on the line 7—7 of Fig. 6; Fig. 8 shows the embodiment of Figs. 6 and 7 assembled in the ring groove of a piston; Fig. 9 is a detailed plan view of a spacer showing another embodiment of my invention, and Fig. 10 is a vertical section taken on the line 10—10 of Fig. 9.

Referring to the figures, and particularly to Figs. 4, 5 and 8, a piston packing constructed according to my invention comprises a pair of split ring members 1 positioned adjacent to the side walls of the ring groove 2 of a piston 3, and formed preferably of ribbon material, such as steel, bent edgewise to substantially circular form. The ring members 1 are separated from each other and are maintained in predetermined axial position in the ring groove 2 by a spacer 4 described more fully hereinafter. The packing may include also an expander 5, as shown in Fig. 5, having passages 6 formed therein to permit oil scraped from the cylinder wall 7 by the ring members 1 to flow freely therethrough to the bottom of the ring groove 2, and thence through ports 8 in the piston 3 to the hollow interior thereof.

The spacer 4 preferably is formed of ribbon or sheet material, such as hard or soft steel, bronze, or other suitable material, bent to substantially circular form, and having a gap 9 between the ends thereof. The spacer 4 shown in Figs. 1 to 5 inclusive is substantially S-shaped in cross-section, and the spacer is positioned in the ring groove between the ring members so that the lower portion thereof opens outwardly toward the cylinder wall and with the upper portion thereof opening inwardly toward the bottom of the ring groove. Oil passages 10 are formed in the central portion 11 of the S-shaped section of the spacer which joins the upper and lower portions of the spacer. The upper and lower portions of the spacer in effect form reservoirs 12 and 13 to receive excess oil scraped from the cylinder wall by the ring members 1, and the oil accumulates in the lower reservoir 12 and, when this reservoir is filled, oil overflows through the passages 10 into the upper reservoir 13 and then drains to the bottom of the ring groove 2 through ports 8 in the piston to the interior thereof. The oil accumulated in the lower reservoir 12 lubricates the cylinder and the piston, and thus prevents excessive wear of these parts.

The spacer 4 described above is formed in a single piece but my invention contemplates also the use of a multiple piece spacer as shown in Figs. 6, 7, 8, 9 and 10. The spacer 4 shown in this embodiment of my invention comprises a pair of substantially circular U-shaped members 14 and 15 formed preferably of sheet or ribbon material and provided with a gap between the ends thereof. As shown in Fig. 8, the U-shaped members 14 and 15 are assembled side by side in the ring groove of the piston between a pair of thin ring members 1 and with the lower U-shaped member 14 opening radially outwardly toward the cylinder wall and with the upper U-shaped member 15 opening radially inwardly toward the bottom of the ring groove 2 to form together a substantially S-shaped spacer. The U-shaped members 14 and 15 provide reservoirs 16 and 17 similar to the reservoirs 12 and 13 described above. The reservoirs 16 and 17 may be connected by a series of passages 18 formed in adjacent faces 19 and 20 of the U-shaped members 14 and 15, and the passages 18 permit oil accumulated in the lower reservoir 16 to overflow into the upper reservoir 17 and thence to the bottom of the ring groove 2, and, as described above, to the hollow interior of the piston. In the embodiment of Figs. 6 and 7, the passages 18 are in the form of circular openings 24 and 25, formed in adjacent faces 19 and 20 of the U-shaped members 14 and 15, and the openings of one member are positioned in registry with the openings of the other member. To prevent relative circumferential movement of the members 14 and 15 and to maintain the openings 24 and 25 in registry with one another a series of projections 21 may be formed on the face 19 of the lower member 14 adjacent to the upper member 15, and the face 20 of the upper member 15 in contact with the lower member 14 may be provided with a series of depressions 22 adapted to receive the projections 21 on the lower member 14.

In the embodiment of Figs. 9 and 10, each of the members has the adjacent faces 19a and 20a thereof slotted as at 26 and 27 to form connecting passages 18a between the members 14 and 15. The slots 26 and 27 in the members 14 and 15 are of such length and are arranged in such manner so that the slots overlap one another at least throughout a portion of their length for any circumferential position of the U-shaped members relative to each other. When the passages 18a are formed in this manner the members 14 and 15 need not be pinned together, but they preferably may rotate circumferentially relative to each other. Any carbon formations which may accumulate in the passages 18a are quickly broken up by relative circumferential movement of the members 14 and 15, and the formations are quickly removed from the passages by oil flowing therethrough.

A piston packing constructed according to my invention removes excess oil from the cylinder wall and lubricates the cylinder and the piston to prevent excessive wear of these parts. The piston packing also is simple in form, cheap to manufacture and efficient in operation.

While I have described several embodiments of my invention it is to be understood that I do not limit myself to the forms and arrangements shown and described because other forms and arrangements may be used also without deviating from the scope of my invention. For instance, the packing may be assembled in the ring groove of a piston so that the ring members in engagement with the cylinder wall are located side by side at the upper portion of the ring groove and any desired number of ring members may be used. The packing may or may not include an expander, depending on the conditions under which the packing is used. Also in the embodiment of Figs. 6, 7 and 8 any suitable means may be used to prevent circumferential movement of the U-shaped members 14 and 15 relative to each other, and the passages in the spacer in all the embodiment shown may assume any convenient shape. In some instances it may even be found advisable to vary the cross-sectional shape of the spacer from that shown in the drawings, and other shapes may be used so long as a reservoir to accumulate oil and lubricate the cylinder wall is provided in the spacer.

In the specification and claims the word "above" is used to designate a direction toward the top of the piston, and the word "below" is used to designate the opposite direction, that is, toward the piston skirt.

What I claim as new and desire to secure by Letters Patent, is:

1. In a piston packing a spacer formed of a pair of U-shaped members positioned one on top of the other, the lower member opening radially outwardly and the upper member opening radially inwardly, and a series of passages joining the interior of said U-shaped members to permit oil to flow from one to the other.

2. In a piston packing a spacer formed of a pair of U-shaped members positioned one on top of the other, each of said members having a series of openings located in the faces of said members adjacent to each other, said openings being formed and arranged therein to overlap for any circumferential position of said U-shaped members relative to each other to permit oil to flow from the interior of one member to the other.

3. In a piston packing a spacer of substantially circular form having a substantially S-shaped cross-section, said spacer being positioned in the ring groove of a piston with the lower portion thereof opening outwardly and with the upper portion thereof opening inwardly, and oil passages formed in the central portion of the S-shaped section of said spacer.

4. A piston packing for use in the ring groove of a piston and comprising a pair of ring members adapted to contact the cylinder wall, a spacer of substantially circular form positioned to maintain said members in predetermined axial position in said groove, said spacer having a substantially S-shaped cross-section and having oil passages formed in the central portion of the S-shaped section of said spacer.

DALLAS M. SMITH.